United States Patent [19]

Umehara et al.

[11] Patent Number: 4,839,099

[45] Date of Patent: Jun. 13, 1989

[54] FIRE-RETARDANT FOR WOODY MATERIALS

[75] Inventors: Kiyoshi Umehara, Izumi-ohtsu; Hisaomi Yamamoto, Chiba; Nobuo Kobayashi, Tokyo; Tsutomu Imai, Izumi-ohtsu, all of Japan

[73] Assignee: Dainippon Ink and Chemicals, Inc., Tokyo, Japan

[21] Appl. No.: 147,018

[22] Filed: Jan. 15, 1988

Related U.S. Application Data

[63] Continuation of Ser. No. 832,401, Feb. 24, 1986, abandoned.

[30] Foreign Application Priority Data

Feb. 27, 1985 [JP] Japan ................................ 60-36279

[51] Int. Cl.$^4$ ........................ C09K 21/00; C09D 5/16; C09D 5/18; B27N 9/00
[52] U.S. Cl. .................... 252/607; 106/18.14; 106/18.15; 106/18.18; 106/18.19; 106/18.2; 106/18.21; 106/18.24; 106/18.31; 252/601; 252/606; 427/393; 427/393.3; 427/408; 427/440; 428/537.1; 428/541; 428/920; 428/921
[58] Field of Search ............... 252/607, 606, 601, 609; 427/393.3, 408, 440, 386, 389.9, 391, 392, 393; 428/447, 448, 446, 920, 921, 537.1, 541, 528, 688, 704; 106/15.05, 18.11, 18.14, 18.15, 18.16, 18.17, 18.18, 18.19, 18.2, 18.21, 18.24, 18.31, 18.33, 18.32

[56] References Cited

U.S. PATENT DOCUMENTS

| | | | |
|---|---|---|---|
| 3,577,270 | 5/1971 | Guth et al. | 427/381 |
| 3,650,670 | 3/1972 | Tesoro et al. | 252/607 |
| 3,816,068 | 6/1974 | Rivlin | 252/607 |
| 3,976,620 | 8/1976 | Golborn et al. | 252/607 |
| 4,063,883 | 12/1977 | Hupfl et al. | 423/302 |
| 4,266,976 | 5/1981 | Gregorian et al. | 252/3 |
| 4,334,877 | 6/1982 | Gregorian et al. | 252/608 |
| 4,585,703 | 4/1986 | Toguchi | 428/446 |

FOREIGN PATENT DOCUMENTS 59-089102  5/1984  Japan.
59-122560  7/1984  Japan.
1011572  12/1965  United Kingdom.

OTHER PUBLICATIONS

ASTM D 2898-81, "Standard Methods for Accelerated Weathering of Fire-Retardant-Treated Wood for Fire Testing", pp. 825-828.
U.S.D.A. Forest Service Research Paper FPL 15-8-1971, "Evaluation of Fire-Retardant Treatments for Wood Shingles".
European Search Report Dated June 5, 1987.
Report on Fire Retardant Treated Western Red Cedar Shingles for E. T. Horn Co., La Mirada, California, Texas Forest Service, Mar. 24, 1983.

(List continued on next page.)

Primary Examiner—Howard J. Locker
Attorney, Agent, or Firm—Sherman and Shalloway

[57] ABSTRACT

A fire retardent for woody materials, which is an aqueous solution comprising 100 parts by weight as solids content of a water-soluble 3-(dialkylphosphonopropionamide) represented by the following general formula

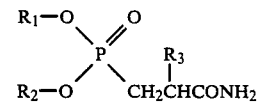

wherein each of $R_1$ and $R_2$ represents an alkyl group having 1 to 3 carbon atoms, and $R_3$ represents a hyrogen atom or a methyl group, and at least 100 parts by weight as solids of a water-soluble melamine resin as essential ingredients and having a pH of not more than 3.

21 Claims, 1 Drawing Sheet

OTHER PUBLICATIONS

Report on Fire Retardant Treated Western Red Cedar Shingles, Texas Forest Service, Feb. 25, 1985.
Los Angeles Fire Department, 10-10-86, Specification for the Testing of Fire Retardant Surface Finishes & Methods of Application on Furnishings or Structures, LAFD Standard #52.
Report on Fire Retardant Treatment & Accelerated Weathering of Cedar Shingles Coated with "Roof Proof", Texas Forest Products Lab. 6/6/86.
Fire Test Evaluation of Cedar Shingles Coated with "Roof Proof" 6/30/86, U.S. Testing Co. Inc., California Branch.
Protection of Wood From Fire, Nov. 1986, Proceedings of S5.03-04, Session 18th IUFRO World Congress, Sappono, Japan. 79 pages.

FIRE-RETARDANT FOR WOODY MATERIALS

This application is a continuation, of application Ser. No. 832,401 filed Feb. 24, 1986, (ABANDONED).

This invention relates to a room temperature curing, expansible intumescent layer-forming (when heated) and weather-resistant fire-retardant to be used on the surfaces of woody materials, and also to fire-retardant woody materials.

Woody materials have long been used widely as building materials in furniture, and for other various uses. In recent years, regulations on fire prevention have become severer in many countries of the world so as to cope with the flammability of woody materials, which is the essential defect of wood. Despite this, few techniques have been developed so far which can efficiently and economically impart weather-resistant fire-retardancy to woody materials, and this constitutes a great cause of a worldwide decline in the consumption of woody materials.

It is a prime objective of this invention to offer an effective solution to the above problem.

Surface-coating process for woody materials is one of the two methods which can make them fire retardant by means of brush coating, hand roll coating, spraying, dipping, etc. Surface coating has the following characteristics when contrasted with vacuum-pressure treatment as another fire-retarding process.

|  | Surface-coating process | Vacuum pressure process |
| --- | --- | --- |
| Cost price of treating equipment | Very low | Very high |
| Treating time and efficiency | Short and high | Long and low |
| Treating at job site | Easy | Not practicable |
| Reduction in the strength of the treated woody material | Very small except for very thin woody substrate | Generally large |
| Fire retardancy after weathering | Some fire-retardants are available for this process | Many types of low cost fire-retardants are available for this process |

In the vacuum-pressure process, a fire retardant solution is impregnated into the internal structure (e.g. vessel) of woody materials by using an expensive autoclave which is a very time-consuming process that normally cannot be applied at a job site. On the other hand, the surface coating process is highly efficient, but has not yet gained widespread acceptance, presumably due to lack of a highly weather resistant fire retardant coating formulation.

The vacuum pressure process is still predominant for fire-retarding woody materials owing to its giving superior weathering resistance. This is so in spite of the complexity of the treating step and its low efficiency. In fact, we have conducted research work on the basis of a known method of fire-retardant treatment of cellulosic fibers (e.g. cotton fabrics) using methylolated products or dialkylphosphonopropionamides or their homologs, (as described, for example, in British Patent No. 1,011,572) in an attempt to establish a room-temperature-curable fire retardant formulation for a woody material with particularly superior water leach resistance or weathering resistance. But we have been unable to establish it easily, as shown hereinafter in Referential Examples. The reasons are threefold:

Firstly, it is believed that the absorption mechanism mode of the fire retardant differs as between natural wood and fully scoured cellulosic fibers owing to their great difference in morphology and plant anatomy in addition to their great difference in chemical compositions. For example, U.S. Pat. No. 2,927,050 gives the following statement in this regard.

"In the fibrous substrates, substantially independent fibers are entangled together, leaving interstices capable of being filled by an aqueous medium by capillary action between all of their surfaces. The individual fibers contain a relatively small amount of cellulose, and the materials composed of them have a relatively low ignition temperature. In wood substrates, however, the cellulosic fibers are bonded together to form a relatively impenetrable block susceptible to little capillary action. A piece of wood has small surface area in relation to the amount of surface area it contains and has a relatively high ignition temperature. Because of these factors, a flameproofing agent which flameproofs fibrous hydrophilic organic materials is not likely to flameproof wood because its capacity to inhibit burning is likely to be destroyed by the time it is heated to the ignition temperature of the wood, and/or because of the difficulty in causing a non-volatile substance to penetrate into the volume of a block of wood."

The following is what is generally known in this field regarding impregnation of wood substrates with fire retardants. U.S. Pat. No. 3,398,019 asserts that the impregnation should be carried out in such a way as to impart fire retardancy to an extent satisfactory for the heat insulation of wood fibers. It further states that, as far as we know, only by the use of a chemical fire retardant which impregnates this thick wood substrate, can a building material be produced which ensures a fire-retardant grade and is commercially acceptable.

Secondly, under curing conditions at 100° C. or lower, the curing reaction among the phosphoruscontaining fire-retardant and woody material and/or a condensation resin used in combination is not completed, and the fire retardant is removed by water extraction mostly.

Thirdly, when a woody material treated with any formulation for cellulosic fabric given in the known literature is in contact with a flame to heat the cured layer of the coated surface, a sufficiently fire retardant carbonized and foamed intumescent layer is not formed (because, for example, the blending ratio of the melamine resin and the phosphorus based fire retardant is inappropriate).

The present invention provides wood substrates with a fire-retardancy which can resist outdoor exposure for at least 5 years, even in Japan or Houston, Texas, where the rainfall is large and the climatic change is periodically four-seasonal, or even in southern California, where the temperature is high and the sunshine is intense throughout the dry season.

The present invention has been completed by finding a limited range of particular fire retardant formulations which can resist severe outdoor exposure. As mentioned below, these formulations are from the wide-ranged fire retardant formulations disclosed in our copending application U.S. Ser. No. 550,606 (corresponding to Japanese Patent Publication No. 89102/1984 or 122560/1984: to be referred to as "our copending application") issued on Apr. 29, 1986 as U.S. Pat. No. 4,585,703.

At first, we planned to employ the rainfall test method described in ASTM E 108-80a (FIRE TESTS OF ROOF COVERING) as the severe outdoor exposure conditions. But we did not actually use it for some reason. In this method, only the influence of rainfall test, and of the subsequent heating at 60° C. for drying, affect the cured layer of fire retardant formulation on a woody substrate. Then we employed the method which is believed to be closer to the actual outdoor exposure conditions, namely the method of Accelerated Weathering Exposure conditions, chosen from the method described in pages 10-12 of the paper of C. A. Holmes entitled "EVALUATION OF FIRE-RETARDANT TREATMENTS FOR WOOD SHINGLES" described in U. S. D. A. Forest Service Research Paper FPL 158-1971, published by U. S. Department of Agriculture, Forestry Service, Forest Service Laboratory, Madison, Wis., U. S. A. We modified this method to make the weathering conditions slightly severer, and used them as a measure of evaluating the weathering resistance.

The device used for this accelerated weathering test is a box-like device made of stainless steel and having the following specifications and performance (see ASTM D2898 Method B).

(1) Two rows each of 12 panels, having a width of 30.48 cm and a length of 78.74 cm for a burning brand test, can be leaned against the device at a gradient of 5/15 (5 in 12).

(2) From type PS sunlamps having an output of 275 W (one for an area of 0.74 m²), ultraviolet light having a wavelength in the range of 2,800 to 4,000 Å and a peak wavelengths of 3,654 Å is irradiated onto the test panels at a distance of 66.04 cm from the surface of the panel in the perpendicular direction.

(3) It has two spray nozzles at its upper portion for spraying water at 2° C. to 16° C. Water can be recycled.

(4) The temperature of the inside of the device can be maintained at a constant level by hot air circulation using a 1,800 W heater and a fan.

(5) The rainfall test, the ultraviolet irradiation at a given temperature, and cessation, can be automatically carried out according to a predetermined time schedule.

The conditions for this accelerated exposure test for 1000 hours are as follows:

(a) The rate of rainfall is 12,344 liters/m² (corresponding to about 740.6 mm per hour).

(b) After the ultraviolet irradiation, the temperature is raised to 65.56° C. within 15 minutes.

(c) Decks for the fire retardant treatment test are shifted in proper order within the device twice a week to avoid variations according to place.

(d) The following tests are carried out within 24 hours, and they are repeated over 42 days without suspension.
 (i) 4 hours waterspray
 (ii) 4 hours sunlamp radiation at 65.56° C. (150° F.)
 (iii) 4 hours waterspray
 (iv) 4 hours sunlamp radiation at 65.56° C. (150° F.)
 (v) 8 hours rest (e) Finally, the test panels are conditioned indoors at a humidity of 30% and a temperature of 26.67° C. (80° F.) until their weight becomes constant.

The author of the above paper concludes as follows with regard to the strength of these accelerated test conditions.

(i) If the water falling on the surfaces of the deck specimens is compared with rainfall, the total water is 10,000 inches (254 m) over the 1,000-hour period. The amount of water sprayed onto any one specimen during the period is equivalent to the total amount of rainfall, at 40 inches (1016 mm) per year, that would fall on and flow over this size specimen in a 35-year period if placed at the eave end of an average 18-foot roof slope.

(ii) The high-temperature ultraviolet irradiation at 65.5° C., followed by the cold-water spray at 2°-16° C., gives a hot-and-cold bath effect. This forces the spray deeper into the wood to dissolve or further dilute any water-sensitive fire-retardant chemicals and thus accelerates the leaching action.

The conditions of U. S. D. A. FPL-1971 given above are very severe in respect of rainfall, ultraviolet irradiation and hot-and-cold bath effect, and ought to correspond fully to at least 5 years of actual weathering in a district having a severe climate, as outlined above. We have used these conditions as a measure of evaluation in accomplishing the present invention.

We have noted that when wood substrates, treated by the method of our copending application, (for example wood substrates treated with room temperature-curable fire retardants as described in Examples 1, 3 and 4 of Japanese Laid-Open Patent Publication No. 89102/1984 and in Japanese Laid-Open Patent Publication No. 122560/1984) are subjected to the aforesaid accelerated weathering test by the U. S. D. A. FPL-1971 method, the fire retardancy is markedly reduced owing to the dissolution of the fire retardant coating agent, and a marked deterioration in appearance quality, shown by cracking or chalking, occurs. We have further studied these methods comprehensively, and have succeeded in establishing a fire retardant, particularly a fire retardant for woody materials, which is room temperature-curing under very limited conditions, and can give fire retardant wood substrates retaining a high level of fire retarding effect and appearance quality even after they are subjected to the accelerated weathering test based on the U. S. D. A. FPL-1971 for more than 1000 hours, by attaching a new requisite to the essential requirements of the inventions in the above two copending Japanese applications.

This invention provides woody materials with fire-retardancy by coating the woody material with an aqueous solution comprising:

(I) 100 parts by weight, as solids, of a water-soluble 3-(dialkylphosphono)propionamide represented by the general formula wherein each of $R_1$ and $R_2$ represents an alkyl group having 1 to 3 carbon atoms, and $R_3$ represents a hydrogen atom or a methyl group,

[in particular, at least one compound selected from 3-(dimethylphosphono)propionamide (to be referred to as DMPPA), 3-(diethylphosphono)propionamide, 3-(di-n-propylphosphono)propionamide and 3-(diisopropylphosphono) propionamide] and, (II) at least 100 parts by weight, preferably 100 to 400 parts by weight, more preferably 170 to 230 parts by weight, as solids, of a water-soluble melamine resin

[particularly in the form of a precondensate, or a condensate having a higher degree of condensation but retaining water solubility, which has a methylol group completely, or partially, etherified with an alcohol preferably having 1 to 3 carbon atoms and at most not more than 3 unreacted reactive hydrogen atoms in the amino groups or imino groups of the structure on an average (namely, an etherified product of hexamethylolmelamine, pentamethylolmelamine, tetramethylolmelamine or trimethylolmelamine with the above alcohol)] as essential ingredients, (III) the pH of said aqueous solution being adjusted to not more than 3, preferably 2.5 to 1.5, with acidic matters, preferably hydrochloric acid.

According to this invention, there is also provided a method of treating a woody material, which comprises (IV) optionally adjusting the time of condensation (gel-time) of the fire-retardant formulation by adding water and a water-soluble alcohol, in a controlled quantity ratio, to the formulation which meets the requirements as (I), (II) or (III) above, (V) coating the fire retardant formulation on the surface of the woody materials at a coverage rate of 100 g/m² as solids, preferably at a rate of 150 to 300 g/m² in terms of the flat area, and curing it preferably at a temperature of not more than 100° C.

As a very beneficial screening test in finding out such requisites as to establish the present invention, we first prepared many small casting molds, 20 cm long for each side and 5 mm deep, by bonding rectangular glass plates having a size of 1 cm by 5 cm on the four sides of a flat square glass plate of which size is 22 cm long for each side. Various fire retardant formulations having a solids concentration of about 60% were poured into the casting molds in an amount of 17 g each in the form of an aqueous solution or a water/methanol solution, and allowed to stand at room temperature (20° C.) for 7 days to cure them completely. The cured products were removed from the casting molds as a fire retardant solid film having a thickness of 0.21 to 0.23 mm. These films were then subjected to a weathering test similar to the above U. S. D. A. FPL-1971 method except that instead of the water spray in the rainfall test, the films were immersed in water at 15° C. for 16 hours, and then ultraviolet light of the same intensity was irradiated at 65° C., for 8 hours (the films were reversed every time the new cycle bean), and these operations constituted one cycle.

First, the weight remaining rate of the film after the weathering test was calculated based on the following expression:

$$\text{Weight remaining rate (\%)} = \frac{\text{Weight of the dried film after weathering}}{\text{Weight of the dried film before weathering}} \times 100 \quad [A]$$

The phosphorus remaining rate of the film after this weathering was calculated in accordance with the following expression:

$$\text{Phosphorus remaining rate (\%)} = \frac{\text{Phosphorus content of the dried film after weathering (\%)}}{\text{Phosphorus content of the dried film before weathering (\%)}} \times 100 \quad [B]$$

Phosphorus was analyzed as follows: About 0.2 to 0.3 g of a sample was precisely weighed, and put in a 50 ml Kjeldahl flask. Water (10 ml) and 5 ml of 98% concentrated sulfuric acid were added, and the sample was thermally decomposed until there was no solid. To complete this decomposition, three drops of 60% perchloric acid were added. This operation was repeated until the solution became completely transparent. The completely decomposed solution was taken into a 25 ml measuring flask, and 1 ml of it was then taken into a 50 ml measuring flask by using a measuring pipette. Pure water (15 ml) was added, and 5 ml of a 3.55% aqueous solution of ammonium molybdate, a 0.12% aqueous solution of ammonium metavanadate and a 12% aqueous solution of ammonium perchlorate were added. The total volume of the solution was adjusted to 50 ml by adding the balance of water. After standing for more than 30 minutes and the color became stable, the absorbancy of the solution was measured with a spectrophotometer using monochromatic light having a wavelength of 400 nm. The phosphorus content was determined from a calibration curve prepared by measuring the absorbance of a phosphoric acid solution of a known concentration after coloration in the above method.

From [A] and [B] above, the retention of the phosphorus content was calculated by following expression:

$$\text{Retention of phosphorus content} = \frac{[A] \times [B]}{100} \, (\%) \quad [C]$$

We furthermore monitored weight changes of the cured melamine resin by weathering in accordance with the well-known method quantitative analysis of nitrogen by the Kjeldahl decomposition method, and confirmed that the aforesaid experimental method was quite appropriate.

In the meantime, we coated various fire retardant formulations within and outside the scope of the invention on various woody substrates, allowed them to stand for 10 days to cure them at room temperature, subjected the coated substrates to weathering in accordance with the aforesaid U. S. D. A. FPL-1971 method, then accurately shaved off the coated surface of a unit area together with the wood, and measured the retention of the phosphorus content and the retention of the cured melamine resin, and then compared the strength of weathering in the two testing methods. As a result it was found that weathering through 20 cycles (480 hours) by the simplified method of weathering using a film corresponds nearly to weathering through 42 cycles (about 1000 hours) by the U. S. D. A. FPL-1971 method. Furthermore, since even a slight difference in formulation could be accurately determined quantitatively as a difference in performance, the above simplified film method was very useful. The details of the test are shown in Examples and Referential Examples given hereinafter.

A typical formulation of this invention is shown below (Formulation Example 1).

|  | Parts by weight |
|---|---|
| A 70% methanol solution of 3-(dimethylphosphono)propionamide (obtained by reacting dimethyl hydrogen phosphite with acrylamide-using a methanol solution of sodium methylate as a catalyst; to be abbreviated as DMPPA) | 275 |
| A 70% aqueous solution of water-soluble methylated hexamethylol-melamine (abbreviated as MMM) | 580 |
| MEGAFAX F833 (penetrant, fluorinated carbon-type amphoteric surface-active agent made by Dainippon Ink and Chemicals, Inc.) | 10 |
| 20% Hydrochloric acid (as HCl) | 125 (25 as HCl) |
| Defoamer (for example, NOPCO NDW made by Diamond Shamrock Co.) | 1 |
| Water | 9 |
| Total | 1000 |

Note:

| pH | 2.0 |
|---|---|
| Specific gravity at 20° C. | 1.17 |
| Solids content | 62.6% |
| Gel time (closed vessel) | about 9 hours (20° C.) (solvent:water/methanol = 97/3) |
| Surface curing time of the coated layer | about 5 hours (20° C.). |

Instead of 275 parts by weight of CMPPA, similar compound such as (A) 275 parts by weight of a 70% aqueous solution of N-methylol 3-(dimethylphosphono) propionamide of the formula

(to be referred to as DMPPA-CH₂OH) known as a fire retardant for cellulosic fibers (the compound claimed in Japanese Patent Publication No. 13976/1966 or British Patent No. 1,011,572), (B) 275 parts by weight of a 70% methanol solution of dimethylol 3-(dimethylphosphono) propionamide of the formula

[to be referred to as DMPPA-(CH₂OH)₂] described in Japanese Patent Publication No. 30992/1971 as a fire retarding compound for cellulosic fibers, (C) 275 parts by weight of a 70% aqueous solution of N-methylol-bis[beta-(dimethylphosphono)propionamide] (to be referred to as DMPPA-DMPPA-CH₂OH) of the formula described in Japanese Patent Publication No. 37797/1971, or (D) 275 parts by weight of a 70% water/methanol solution of bis[beta-(dimethylphosphono) propionamide] (to be referred to as DMPPA-DMPPA) which is the unmethylolated product of (C) above, were used separately, and formulated as shown in Referential Examples 1 to 4. Each of these formulations was cured at 25° C. for 7 days in the casting mold, as explained above. Each resulting film was subjected to one cycle of weathering by the above said simplified film weathering method. It was found surprisingly that the retention of the phosphorous content of formulation Example 1 was about 70% in the case of crude DMPPA, which contained 4 to 6% of phosphite salts, such as sodium monomethyl phosphite and/or sodium phosphite and/or unreacted dimethyl hydrogen phosphite. In the case of the DMPPA purified to a purity of above 99%, by removing the above said impurities by, for instance, recrystallization, or using ion-exchanging resins, or ion-exchanging membrane method, the phosphorous content retention was above 90%. However, in the same tests for the cured films which contained the fire-retardant compounds (A), (B), (C) or (D), each phosphorous retention was lower than about 50%, and none showed a phosphorous retention above 60%; in short, a greater part of the fire retardant was leached out after weathering.

The reason for such low level of weathering resistance, in the case of a coverage rate of 100–400 g/m² as solids, was due presumably to the difficulty of carrying out condensation of the fire-retardant layer (which consists any of the fire-retardants (A), (B), (C) and (D) above which are outside the scope of this invention,) without being cured to such an extent as to become fully water-insoluble solid. To obtain laundry resistant fire retardancy on cellulosic fibers by using these compounds (A), (B) and (C), it is necessary to use a melamine resin in combination and heat-treat the impregnated fabric at 160° C. for about 5 minutes. Curing at room temperature is desirable for flame-retardant coatings on woody surfaces because at high temperatures the quality of woody materials is degraded and actually, such a method is commercially difficult to practice. It has been confirmed that by curing at room temperature these fire retardant compounds containing methylol groups are not suitable for obtaining a high level of weathering resistance. The compound (D), given above, contains no methylol group, but its curability by cocondensation with the melamine resin at room temperature is much lower than the fire retardant of this invention; and as shown in Referential Example 4, the retention of the phosphorus content, after weathering its film through one cycle of the simplified weathering method, was very low.

To obtain a high level of weathering resistance with Formulation Example 1, it is necessary that the methylated methylolmelamine should be a precondensate, (or a condensation product of a higher degree of condensation, which keeps the product water-soluble), of an etherified product of tetramethylolmelamine, pentamethylolmelamine or hexamethylolmelamine, with an alcohol having 1 to 3 carbon atoms, preferably methyl alcohol. The use of a water-soluble melamine, having a small amount of reactive groups such as methylated trimethylolmelamine, produced slightly inferior results in regard to weathering resistance. Water-soluble aminoplasts other than such melamine resins, (for example, methylolated products or alkylated methylolated products of amino compounds such as urea, thiourea, guanidine salts, guanidine ureas or dicyandiamide, or cocondensates of these amino compounds and melamine) may be used in small amounts as a mixture with the melamine resin within the scope of the invention. As the mixing proportion of such an aminoplast increases, a room temperature-cured film of the fire retardant becomes fragile, or its weathering resistance is markedly reduced. The use of a cocondensate of acetoguanamine or benzoguaninamine with melamine leads to reduced weathering resistance, but this can slightly plasticize the film of the retardant. Since, however, the 3-(dialkylphosphono)propionamide used in this invention has an excellent plasticizing effect, there is no particular advantage in using such guanamines.

The particularly important feature of the present invention is that the fire retardant formulation is used after its pH is adjusted to a very limited range of not more than 3, preferably 2.5 to 1.5. When various acidic catalysts were added to Formulation Example 1, instead of 20% hydrochloric acid, the pH of the formulation was as shown in the following table (in the following table, the blending proportion is the weight percent of the catalyst based on the total solids content of the fire retardant and the melamine resin; water was added so that the total amount of the blended solution became 1,000 parts by weight).

| Acid catalyst | Blending proportion (%) | pH immediately after blending | Relation to the invention |
| --- | --- | --- | --- |
| p-Toluenesulfonic acid | 5 | 3.90 | Outside the scope of the invention |
| Ammonium chloride | 5 | 5.20 | Outside the scope of the invention |
| Nitric acid | 5 | 2.98 | Within the scope of the invention |
| Nitric acid | 7 | 2.45 | Within the scope of the invention |
| Nitric acid | 9 | 1.90 | Within the scope of the invention |
| Nitric acid | 10 | 1.60 | Within the scope of the invention |
| Sulfuric acid | 4 | 3.35 | Outside the scope of the invention |
| Sulfuric acid | 7 | 2.35 | Within the scope of the invention |
| Sulfuric acid | 9 | 1.90 | Within the scope of the invention |
| Hydrochloric acid | 3 | 2.50 | Within the scope of the invention |
| Hydrochloric acid | 3.5 | 2.20 | Within the scope of the invention |
| Hydrochloric acid | 4 | 2.00 | Within the scope of the invention |
| Hydrochloric acid | 5 | 1.55 | Within the scope of the invention |
| Hydrochloric acid | 6 | 1.10 | Within the scope of the invention |
| Phosphoric acid | 5 | 3.27 | Outside the scope of the invention |

Of these, hydrochloric acid, sulfuric acid, p-toluenesulfonic acid, phosphoric acid and nitric acid may be used as catalysts suitable for the object of this invention. Above all, hydrochloric acid is preferred because the amount required can be small and gives superior weathering resistance.

The formulation (1000 parts by weight) in Example 1 of the applicant's copending Japanese Laid-Open Patent Publication No. 122560/1984 contains 250 parts by weight of 70% 3-(dimethylphosphono)propionamide, 500 parts by weight of 70% methylated methylolmelamine, 10 parts by weight of ammonium chloride, 3 parts by weight of a sodium salt of succinic acid ethylene oxide sulfate, 50 parts by weight of a fine powder of magnesium silicate and 192 parts by weight of water, and this is close to the fire retardant formulation of the present invention. But its pH is 6.0 immediately after formulation, and it has very low weathering resistance in comparison with the examples of this invention, as is clearly seen from Referential Examples 7 and 8 given below. Japanese Laid-Open Patent Publications Nos. 122560/1984 and 89102/1984 do not give an example of using a fire retardant formulation having a pH of 3 or lower.

Figure 1:
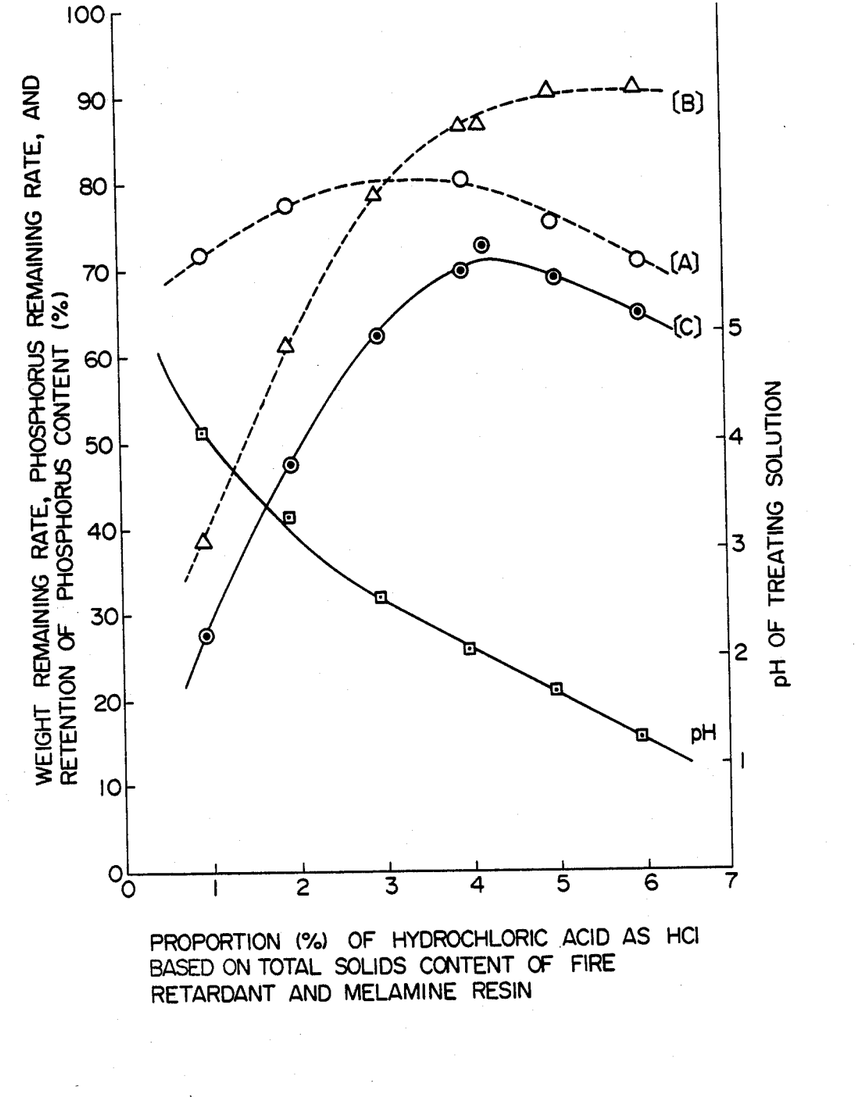
The accompanying drawing is a graph showing the effect of the pH of the treating solution (the amount of hydrochloric acid added) on the weight remaining rate, the rate of remaining phosphorus and the retention of the phosphorus content after one cycle of the simplified weathering test. In the drawing, [A] represents the weight remaining rate; [B], the phosphorus remaining rate; and [C], the retention of the phosphorus content.

The pH of the treating solution exerts a very great influence on the weathering resistance of fire retardancy in the case of curing at room temperature. This fact is shown in the accompanying drawing.

It is noteworthy that if similar compounds such as (A), (B), (C) and (D) above are used as fire retardants and cured at room temperature, they do not show as high a level of weathering resistance as in the present invention, even if the pH of the treating solution is adjusted to 3 or lower. This fact will be shown in Referential Examples 14 to 16 below.

In the present invention, the solids content of a surface coated film from the treating solution, having a low pH of not higher than 3, for example 2.5 to 1.5, also has a low pH, and its strong acidity might degenerate the wood in contact with the coating agent, and degrate its physical properties. Then we coated the treating solution (pH 2.0) using Formulation Example 1 on a red cedar shingle (produced in U. S. A.) at a rate of 250 g/m², allowed it to cure at 25° C. for 7 days, exposed it to an Atlas-type fade-ometer at 65° C., and observed changes in appearance quality, adhesion and strength of the coated film every 200 hours (corresponding to one year of actual sunlight irradiation). As the irradiation proceeded, the appearance of the film tended to turn slightly pale brown, but the degree of discoloration after 1000 hour exposure was not particularly large. Moreover, no remarkable decrease in adhesion or the strength of the coated film layer was noted. A dispersion, obtained by adding to a finely pulverized powder of this coated film 30 times its amount of pure water, had a pH of 2.8. The chlorine in the fine powder was quantitatively analyzed, and it was found that more than 95% of chlorine used remained in the fine powder and scarcely scattered into the air during curing at room temperature. This fact suggests that, although its mechanism is not known, the acidic substance used in a large amount forms a kind of bond having affinity for the condensation product of the phosphorus-containing fire retardant and the melamine resin, for example a quaternary ammonium salt structure, and is confined stably.

Another advantage of the formulation in accordance with this invention is that it shows a kind of buffer action which is believed to be due to the existence of affinity of the acidic curing agent for the basicity of the water-soluble melamine resin. For this reason, the treating solution based on Formulation Example 1 is less irritating to the mucous membranes or skin of the personnel engaged in the spraying operation than an aqueous solution containing the same amount of hydrochloric acid (2.5% as HCl, pH 0.05).

The similar fire retarding compounds (A), (B), (C) and (D), because of the convenience of synthesis, contain free formaldehyde, for example in an amount of about 1 to 4% for a 70% solution. In contrast, the fire retarding compound of this invention does not contain any free formaldehyde and acts as a catcher both for several percent of free formaldehyde contained in the melamine resin and for free formaldehyde which is formed as the condensation proceeds, and of which amount increases during the progress of the condensation and reaches a maximum just before the condensation product gels and becomes water-insoluble. For example, the fire retardant of Formulation Example 1 immediately after formulation has a free formaldehyde content of 0.6%, whereas a fire retardant of Formulation Example 1 (except that DMPPA is replaced by the compound (A), i.e. DMPPA-CH₂OH) has a free formaldehyde content of 1.2%. This means that the amount of poisonous and irritating formaldehyde inhaled by the worker is reduced to about half, and this greatly serves to improve the working environment. To decrease free formaldehyde further from the formulation of this example, it is effective to add a small amount of ethyleneurea or melamine as a formaldehyde catcher.

The solids content of the melamine resin relative to the fire retardant compound may be freely chosen from the range of at least 100 parts by weight, preferably 100 to 400 parts by weight, per 100 parts by weight of the fire retarding compound. If it is less than 150 parts by weight, weathering resistance tends to be reduced slightly in the case of curing at room temperature. If it is less than 100 parts by weight, the fire retarding formulation shows tackiness, and the weathering resistance is markedly reduced to a non-practical extent. On the other hand, even if it is used in an amount of more than 400 parts by weight, the weathering resistance does not further increase, and such an excessive amount of the melamine resin is rather disadvantageous because the phosphorus concentration in the cured solid decreases and results in a reduction in fire retarding effect.

When the blending ratio of the fire retarding compound/melamine resin is 100:210 (parts by weight) or a ratio close to it, a film of the fire retardant formulation obtained by curing at room temperature is transparent and has considerable flexibility. However, films prepared in the same manner, except that the compounds (A), (B), (C) and (D) above are used instead of the fire retardant compound of this invention, have in many cases fine cracks or foams, or are hazy and tend to be fragile. Such differences tend to increase as they are subjected to weathering. A colorless, transparent flexible film is also obtained when 3-(diethylphosphonopropionamide) or 3-(diisopropylphosphonopropionamide) as a fire retarding compound is used instead of DMPPA. As is suggested by a comparative study of the appearance of films after weathering in Referential Examples and Examples shown in Tables 1 and 2 below, when wood substrates are surface-coated with these formulations, cured at room temperature and subjected to weathering through 42 cycles (1000 hours) by the aforesaid U. S. D. A. FPL-1971 method, the appearance quality of the treated woody surfaces in Examples are satisfactory, whereas in the case of the treated woody surfaces in Referential Examples, the coated film falls off from the woody surfaces, or undergoes chalking or cracking.

When either a melamine resin or the fire retardant compound of this invention is singly surface-coated on a woody surface, a carbonized and expanded intumescent layer is not formed even when the coated substrate is heated by contacting it with a flame. However, a cured, coated film layer formed from the fire retardant of this invention, containing both of these compounds on the surface of a woody surface, readily forms an intumescent layer and contributes to fire retardancy. It is noteworthy that when, as in Formulation Example 1, the mixing ratio of the solids of the fire retarding compound/the solids of the melamine resin is 100:170–230, there is formed a carbonized intumescent layer having a maximum expansion ratio.

To increase weathering resistance further in this invention, it is desirable to use a moderate amount of a penetrant which is stable at a pH of not more than 3. Examples of the penetrant are dialkylbenzene disulfonate-type surface active agents (such as DOWFAC 2A-1 manufactured by Dow Chemical Company), cationic surface-active agents and amphoteric fluorocarbon based surface-active agents (such as MEGAFAC F833 manufactured by Dainippon Ink and Chemicals, Inc.). If the penetrant is used in an amount more than necessary, the weathering resistance of the fire-retardant coating is inevitably reduced. If, however, it is used in an amount of not more than about 1% based on the treating solution, it aids in the penetration of the fire retardant into the wood to some extent and serves to increase its weathering resistance.

As another additive, the use of a small amount of a defoamer is desirable. For example, by using about 0.5 to 5 g/liter of NOPCO NDW (a product of Diamond Shamrock), or a silicone-type defoamer, the coated surface becomes uniform. Furthermore, as a sedimentation preventing agent, polyvinyl pyrrolidone having a number average molecular weight of at least 100,000 can be added in an amount of 0.5 to 5% by weight as solids. In addition to the various additives mentioned above, the fire retardant of this invention may contain a crack preventing agent (e.g., wood flour, colloidal silica, inorganic fibers, plasticizers, polymers or water soluble high-boiling compounds), acid-resistant disperse pigments for coloration, perfumes, deodorants, various other fire retardants and anti-sagging agents. The other fire retardants which particularly increase the effect of this invention include, for example, water-insoluble powdery or emulsified phoshorus-containing compounds, organic phosphorus-containing compounds, organic compounds containing phosphorus and halogen, and organic halogen compounds used either singly or in combination. Specific examples are red phosphorus, phosphagen, polyammonium polyphosphate, chlorinated paraffins, chloroalkyl phosphates, and polybrominated bisphenols. The suitable amount of each of such additives is not more than 5% by weight based on the total weight of the fire retardant.

If a woody surface coated with the fire retardant formulation of this invention and then cured is brought into intermittent contact with water having a high hardness, for example when it is subjected to a rainfall test using water containing more than 100 ppm of calcium oxide (as CaO), and the woody substance permits adsorption of an alkaline earth metal hydroxide or carbonate, it sometimes happens that the fire retarding effect is markedly reduced even when the cured product of the fire retardant formulation does not dissolve in water and mostly remains. The reason for this is that phosphorus pentoxide, formed by the heating and final decomposition of the DMPPA component in the cured product, reacts with the alkaline earth metal hydroxide or carbonate absorbed on the woody materials to form an alkaline earth metal phosphate which has no fire retardancy any more. This reduction in fire retardancy can be prevented by adding the aforesaid organic compounds containing halogen and phosphorus, or the organic halogen compounds, to the formulation of this invention. This can lead to the obviation of adverse effects by the use of hard water during the fire extinguishing activities in the event of fire.

The fire retardant of this invention is coated on woody surfaces in the form of an aqueous solution or as a solution in a water-soluble organic solvent, such as methanol, ethanol or isopropanol, or a mixture of these organic solvents. The gel time can be prolonged to a considerable extent if the amount of water in the solution is decreased and the amount of the alcohol in it is increased. For example, the relation between the composition of the solvent and the gel time for Formulation Example 1 is as follows.

| Measuring temperature (°C.) | Solvent composition (water/methanol by weight) | Gel time (hours) |
| --- | --- | --- |
| 40 | 97/3 | about 1 |
| 40 | 85/15 | about 5 |
| 30 | 97/3 | about 3 |
| 30 | 95/5 | about 4 |
| 30 | 90/10 | about 7 |
| 30 | 85/15 | more than 9 |
| 20 | 97/3 | about 9 |

This means that both the stability of a formulation which is dependent on the temperature of the atmosphere, and the gel-time convenient to the worker at the time of application, can be easily regulated by simply adjusting the content of the water-soluble alcohol. It is noteworthy that when the treating solution is coated on the surface of a woody surface after prolonging its gel time (stability) as above, in addition, the alcohol in the formulation evaporates earlier than water, and the treating solution is rapidly concentrated. Consequently, the curing reaction proceeds rapidly in this case.

The preferable method of surface coating in this invention is to use a spray gun, a hand roll coater or a brush, or to immerse the wood substrate in the treating solution. When the coating is done on one surface of the woody materials, the coverage rate of the coating is at least 100 g/m$^2$, preferably 150 to 300 g/m$^2$, as solids. The solids concentration of the coating agent is desirably about 60%. If the concentration is higher, say, above 70%, the flow of the treating solution becomes poor, and then it becomes difficult to obtain a uniform coated surface. If it is adjusted to 50% or lower, the penetration of the treating solution into the inside structure of the woody material becomes too large in the case of some types of the woody material, for example a quarter-sawed thin plate. Thus, the treating solution penetrates too far into the inside of the wood and the fire retarding efficiency will be reduced.

If in applying a fire retardant coating in accordance with the formulation of this invention, the woody material has a moisture content of less than 5% and is excessively porous as a result of long-term outdoor exposure, it is desirable to pre-treat the surface of the woody material with water by spraying or brush coating to give moisture to some extent. By so doing, fire retardancy can be efficiently obtained on such a woody material even when the amount of the treating solution to be applied is relatively small (for example, not more than 150/m$^2$). In this case, it is desirable to perform surface coating after the water-treated wood substrate is left to stand for a given time and the water is uniformly diffused and penetrated. Conversely, when the wood substrate contains an excessively large amount of water, the coated fire retardant film may fall off from it, or may sag. Accordingly, the water content of the woody material to be coated is desirably in the range of 8 to 30%. When this moisturizing treatment before the coating is properly carried out, it is sometimes possible to prevent warping of the substrate by coating.

Other methods of treating a wood substrate with the fire retardant of this invention include, for example, (i) a vacuum method, (ii) a pressure method and (iii) a vacuum pressure method. The most easily practicable method is as follows: The woody material is put in an acid-resistant autoclave, and the fire retardant solution is put in it so that all the wood substrate is submerged under the solution and a space exists in the upper part of the vessel. When the upper space is maintained under reduced pressure under predetermined conditions, the air in the internal structure of the woody material is removed, and according to the level of the reduced pressure (negative pressure), an equilibrium is reached after a certain period of time. Then, the pressure of the space is returned to normal atmospheric pressure, and the woody material is left to stand in the solution for the same period of time as required for pressure reduction. As a result, the woody material is pressurized by a positive pressure of the same level as the reduced pressure, and a considerable amount of the fire retardant penetrates into the inside structure of the woody material, and a fire retardancy having more durability than by surface coating can be imparted. If further pressurization is carried out at this stage, the amount of the fire retardant impregnated into the woody material increases further.

The fire retardant formulation of this invention can be used in a very broad range of applications including almost all cases of fire-retardant treatment of woody materials which requires weathering resistance, namely all woody materials exposed to outdoor weather, such as shingle and shakes (e.g. pine or cedar) for roof coverings, window frames, doors, stairs, fences, porches, trellises, steps, wall panellings, exterior trims, fence rails, arbors, pillars, interior materials for ships or bathrooms, door cases for domestic animal pens and Japanese-type houses, timberings, wooden boxes for packaging used in exportation, and woody materials used in shrines and temples. The present invention can of course be applied effectively to woody materials used indoors such as ceilings, floorings, underplates of floors, interior wall materials, furniture, frames of sliding paper doors in Japanese houses, furring strips, interior doors and pillars. There is no particular restriction on the kind of the woody material to which the method of this invention can be effectively applied, and almost all natural wooden materials can be efficiently rendered fire-retardant by the present invention. However, a sufficient fire retarding effect cannot be obtained, or can be obtained only without weathering resistance, on boards having a hydrophobic surface layer such as an unsaturated polyester resin coated decorative board, plywoods having high hydrophobicity surface containing large amount of a phenolic resin, melamine resin, a urea resin, or the like, cured by heating under pressure, and natural wood materials having a coated hydrophobic surface layer.

The film retarding compounds in accordance with this invention, for example, DMPPA, have very low oral toxicity with an $LD_{50}$ (rat) of at least 5000 mg/kg and no mutagenicity. Since the melamine resin contains a small amount of formaldehyde, it is slightly irritating to a living body. By the above-mentioned embodiments of surface coating, ordinary handling care will obviate irritation to the human body or adverse affects on health. Since the fire retardant solid of this invention generates a slight amount of formaldehyde over long periods of time, it also acts durably as an insect controlling agent or an antiseptic for woody materials having weathering resistance. A wooden plate coated on both surfaces with this fire retardant by the impregnation method is especially good in these properties. In particular, when a small amount of, for instance, not more than 10 g/liter of thiourea is added, the insect-controlling and antiseptic effects last, and a considerable effect of catching free formaldehyde and some increase in fire retardancy can be expected.

The following examples illustrate the present invention more specifically.

Referential Examples 1 to 15 and Examples 1 to 9

In each run, a film cured at room temperature was prepared base on the fire retardant formulations shown in Tables 1 and 2, and subjected to weathering by the aforesaid simplified film method through 1 cycle, 6 cycles and 20 cycles as shown in these tables. The weight remaining rate [A], the phosphorus retention [B] and the retention of the phosphorus content [C] were determined. The abbreviations used in the tables for the fire retarding compounds and the melamine resin are as given hereinabove. In the tables, the concentration of the acid catalyst is the weight percent based on the total solids content of the fire retarding compound and the melamine resin.

In these tables, the fire retardancy test after 1000 hour weathering was carried out as follows: Testing decks prepared from roof covering shingles of standard red cedar obtained occurring in U. S. A. which passed in the test of Red Cedar Shingle & Handsplit Bureau, U. S. A. were surface-coated by a spray gun with each of formulations at a rate of 250 g/m². The coating was allowed to cure at about 20° C. for 7 days, and then subjected to the aforesaid accelerated weathering test in accordance with the U. S. D. A. FPL-1971 method through 42 cycles (1000 hours), and dried in a room kept at a humidity of 30% and a temperature of 27° C. until its weight became constant. Then, the burning brand test corresponding to class C of ASTM E-108 80a was conducted five times for each deck. Those brands which did not penetrate to the back side of the installed portion of the deck but selfextinguished, were rated as acceptable.

TABLE 1

| Formulations Referential Example | Examples outside the scope of invention in which chemicals and pH are out of the scope | | | | |
|---|---|---|---|---|---|
| | 1 | 2 | 3 | 4 | 5 |
| Formulation (parts by weight/ 1,000 parts by weight) | | | | | |
| DMPPA—CH₂OH (70%) | 275 | | | | |
| DMPPA—(CH₂OH)₂ (70%) | | 275 | | | |
| DMPPA—DMPPA—CH₂OH (70%) | | | 275 | | |
| DMPPA—DMPPA (70%) | | | | 275 | |
| DMPPA (70%) | | | | | 275 |
| MMM (hexamethylol-type) (70%) | 580 | 580 | 580 | 580 | 580 |
| MEGAFAC F833 (penetrant) | 15 | 15 | 15 | 15 | 15 |
| 75% Aqueous p-toluene sulfonic acid | 42 | 42 | 42 | 42 | 42 |
| 20% Aqueous ammonium chloride | | | | | |
| 85% Aqueous phosphoric acid | | | | | |
| 36% Monoethanolamine hydrochloride | | | | | |
| 20% Hydrochloric acid | | | | | |
| Water | 88 | 88 | 88 | 88 | 88 |
| Total solids concentration (%) | 63.2 | 63.2 | 63.2 | 63.2 | 63.2 |
| Proportion of the catalyst (based on solids, %) | 5.0 | 5.0 | 5.0 | 5.0 | 5.0 |
| Ratio of the solids of fire retarding compound to the solids of melamine resin | 1/2.1 | 1/2.1 | 1/2.1 | 1/2.1 | 1/2.1 |
| pH of the treating solution | 3.6 | 3.9 | 3.0 | 3.8 | 3.7 |

TABLE 1-continued

| | | | | | |
|---|---|---|---|---|---|
| Appearance of the film | Transparent | Transparent | Transparent | Transparent | Transparent |
| Weight of the film (250 g/m²) | 250 | 250 | 250 | 250 | 250 |
| Appearance of the film after one weathering cycle | Cracked | Cracked | Cracked | Transparent | Transparent |
| Weight remaining rate (%) | 63.4 | 68.0 | 67.0 | 69.8 | 78.0 |
| Phosphorus remaining rate (%) | 21.6 | 30.0 | 29.1 | 21.4 | 43.0 |
| Retention of the phosphorus content (%) | 13.7 | 20.6 | 19.3 | 19.9 | 34.0 |
| Appearance of the film after six weathering cycles | Cracking increased | — | — | — | Transparent |
| Weight remaining rate (%) | 60.3 | — | — | — | 69.3 |
| Phosphorus remaining rate (%) | 21.4 | — | — | — | 49.2 |
| Retention of the phosphorus content (%) | 12.9 | — | — | — | 34.1 |
| Fire retardancy of woody material after 1,000 hour weathering | | | | | |
| Number of brands rated "Passed" | 0 | 0 | 0 | 0 | 2 |
| Number of brands rated "Failed" | 5 | 5 | 5 | 5 | 3 |
| Evaluation | Failed | Failed | Failed | Failed | Failed |

| Formulations | Examples outside the scope of invention as to the use of catalysts | | | | | | |
|---|---|---|---|---|---|---|---|
| Referential Example | 6 | 7 | 8 | 9 | 10 | 11 | 12 |
| Formulation (parts by weight/ 1,000 parts by weight) | | | | | | | |
| DMPPA—CH₂OH (70%) | | | | | | | |
| DMPPA—(CH₂OH)₂ (70%) | | | | | | | |
| DMPPA—DMPPA—CH₂OH (70%) | | | | | | | |
| DMPPA—DMPPA (70%) | | | | | | | |
| DMPPA (70%) | 275 | 275 | 275 | 275 | 275 | 275 | 275 |
| MMM (hexamethylol-type) (70%) | 580 | 580 | 580 | 580 | 580 | 580 | 580 |
| MEGAFAC F833 (penetrant) | 15 | 15 | 15 | 15 | 15 | 15 | 15 |
| 75% Aqueous p-toluene sulfonic acid | 84 | | | | | | |
| 20% Aqueous ammonium chloride | | 90 | 30 | | | | |
| 85% Aqueous phosphoric acid | | | | 21 | | | |
| 36% Monoethanolamine hydrochloride | | | | | 130 | 75 | |
| 20% Hydrochloric acid | | | | | | | 30 |
| Water | 46 | 40 | 100 | 108 | 0 | 55 | 100 |
| Total solids concentration (%) | 66.2 | 61.4 | 60.6 | 61.8 | 64.5 | 63.0 | 60.6 |
| Proportion of the catalyst (based on solids, %) | 10.0 | 3.0 | 1.0 | 3.0 | 7.0 | 5.0 | 1.0 |
| Ratio of the solids of fire retarding compound to the solids of melamine resin | 1/2.1 | 1/2.1 | 1/2.1 | 1/2.1 | 1/2.1 | 1/2.1 | 1/2.1 |
| pH of the treating solution | 3.3 | 5.6 | 5.8 | 3.8 | 4.9 | 5.2 | 4.1 |
| Appearance of the film | Transparent | Transparent | Transparent | Hazy | Pale yellow | Transparent | Transparent |
| Weight of the film (250 g/m²) | 250 | 250 | 250 | 250 | 250 | 250 | 250 |
| Appearance of the film after one weathering cycle | Transparent | Transparent | Transparent | Hazy | Pale yellow | Transparent | Transparent |
| Weight remaining rate (%) | 77.4 | 70.5 | 69.8 | 66.1 | 67.9 | 67.1 | 71.5 |
| Phosphorus remaining rate (%) | 56.6 | 46.6 | 33.7 | 26.6 | 51.9 | 38.9 | 38.7 |
| Retention of the phosphorus content (%) | 43.8 | 32.9 | 23.5 | 17.6 | 35.2 | 26.1 | 27.7 |
| Appearance of the film after six weathering cycles | Transparent | Transparent | Transparent | — | — | — | — |
| Weight remaining rate (%) | 68.2 | 65.0 | 69.8 | — | — | — | — |
| Phosphorus remaining rate (%) | 64.1 | 47.0 | 33.7 | — | — | — | — |
| Retention of the phosphorus content (%) | 43.7 | 30.7 | 23.5 | — | — | — | — |
| Fire retardancy of woody material after 1,000 hour weathering | | | | | | | |
| Number of brands rated "Passed" | 3 | 2 | 1 | 0 | 2 | 1 | 2 |
| Number of brands rated "Failed" | 2 | 3 | 4 | 5 | 3 | 4 | 3 |
| Evaluation | Failed | Failed | Failed | Failed | Failed | Failed | Failed |

TABLE 2

| Formulations | Similar formulations outside the scope of the invention | | | Invention (using varying ratios of HCl) | | | | |
|---|---|---|---|---|---|---|---|---|
| Referential Example (RE) or Example (E) | RE 13 | RE 14 | RE 15 | E 1 | E 2 | E 3 | E 4 | E 5 |
| Formulation (parts by weight/ 1,000 parts by weight) | | | | | | | | |
| DMPPA—CH₂OH (70%) | 275 | | 275 | | | | | |
| DMPPA—DMPPA (70%) | | 275 | | | | | | |
| DMPPA (70%) | | | | 275 | 275 | 275 | 275 | 275 |
| MMM (hexamethylol-type) (70%) | 580 | 580 | | | 580 | 580 | 580 | 569 |
| MMM (trimethylol-type) (70%) | | | 580 | 580 | | | | |
| MAGAFAC F833 (penetrant) | 15 | 15 | 15 | 15 | 15 | 15 | 15 | 14 |
| 20% Hydrochloric acid | 120 | 120 | 120 | 120 | 90 | 90 | 90 | 147 |

TABLE 2-continued

| | | | | | | | | |
|---|---|---|---|---|---|---|---|---|
| Water | 10 | 10 | 10 | 10 | 40 | 40 | 40 | |
| Total solids concentration (%) | 62.4 | 62.4 | 62.4 | 62.4 | 61.8 | 61.8 | 61.8 | 61.8 |
| Proportion of hydrochloric acid (%, based on solids content) | 4.0 | 4.0 | 4.0 | 4.0 | 3.0 | 3.0 | 3.0 | 5.0 |
| Ratio as solids of fire retardant/melamine resin | 1/2.1 | 1/2.1 | 1/2.1 | 1/2.1 | 1/2.1 | 1/2.1 | 1/2.1 | 1/2.1 |
| pH of the treating solution | 2.2 | 2.3 | 2.5 | 2.4 | 2.5 | 2.5 | 2.5 | 1.6 |
| Appearance of the film before weathering | Slightly hazy | Clear | Slightly hazy | Clear | Clear | Clear | Clear | Clear |
| Weight of the film (g/m²) | 250 | 250 | 250 | 250 | 250 | 200 | 250 | 250 |
| Appearance of the film after one weathering cycle | Hazy | Slightly hazy | Hazy | Slightly hazy | Clear | Clear | Clear | Clear |
| Weight remaining rate (%) After one weathering cycle | 63.6 | 69.7 | 68.0 | 75.3 | 78.9 | 80.5 | 80.5 | 75.9 |
| Phosphorus remaining rate (%) after one weathering cycle | 47.9 | 54.5 | 30.3 | 69.8 | 78.9 | 85.9 | 86.7 | 90.8 |
| Retention of the phosphorus content (%) after one weathering cycle | 30.5 | 38.0 | 20.6 | 52.6 | 62.3 | 69.1 | 69.8 | 68.7 |
| Appearance of the film after 20 weathering cycles | — | — | — | — | Clear | Clear | Clear | Clear |
| Weight remaining rate (%) after 20 weathering cycles | — | — | — | — | 71.7 | 72.3 | 72.8 | 68.6 |
| Phosphorus remaining rate (%) after 20 weathering cycles | — | — | — | — | 71.8 | 90.3 | 90.3 | 88.8 |
| Retention of the phosphorus content (%) after 20 weathering cycles | — | — | — | — | 51.8 | 65.3 | 65.7 | 62.8 |
| Fire retardancy of woody material after 1,000 hour weathering | | | | | | | | |
| Number of brands rated "Passed" | 2 | 2 | 1 | 5 | 5 | 5 | 5 | 5 |
| Number of brands rated "Failed" | 3 | 3 | 4 | 0 | 0 | 0 | 0 | 0 |
| Evaluation | Failed | Failed | Failed | Passed | Passed | Passed | Passed | Passed |

| Formulations Referential Example (RE) or | Invention (using varying ratios of fire retardant/melamine resin) | | | |
|---|---|---|---|---|
| | E 6 | E 7 | E 8 | E 9 |
| Example (E) Formulation (parts by weight/1,000 parts by weight) | | | | |
| DMPPA—CH₂OH (70%) | | | | |
| DMPPA—DMPPA (70%) | | | | |
| DMPPA (70%) | 305 | 342 | 251 | 231 |
| MMM (hexamethylol-type) (70%) | 550 | 513 | 604 | 624 |
| MMM (trimethylol-type) (70%) | | | | |
| MAGAFAC F833 (penetrant) | 15 | 15 | 15 | 15 |
| 20% Hydrochloric acid | 120 | 120 | 120 | 120 |
| Water | 10 | 10 | 10 | 10 |
| Total solids concentration (%) | 62.4 | 62.4 | 62.4 | 62.4 |
| Proportion of hydrochloric acid (%, based on solids content) | 4.0 | 4.0 | 4.0 | 4.0 |
| Ratio as solids of fire retardant/melamine resin | 1/1.8 | 1/1.5 | 1/2.4 | 1/2.7 |
| pH of the treating solution | 2.1 | 2.1 | 2.1 | 2.2 |
| Appearance of the film before weathering | Clear | Clear | Clear | Clear |
| Weight of the film (g/m²) | 250 | 250 | 250 | 250 |
| Appearance of the film after one weathering cycle | Clear | Clear | Clear | Clear |
| Weight remaining rate (%) after one weathering cycle | 77.7 | 75.0 | 82.4 | 83.1 |
| Phosphorus remaining rate (%) after one weathering cycle | 84.7 | 84.4 | 86.9 | 87.1 |
| Retention of the phosphorus content (%) after one weathering cycle | 65.8 | 63.3 | 71.6 | 72.3 |
| Appearance of the film after 20 weathering cycles | Clear | Clear | Clear | Clear |
| Weight remaining rate (%) after 20 weathering cycles | 70.8 | 67.5 | 75.5 | 75.8 |
| Phosphorus remaining rate (%) after 20 weathering cycles | 87.5 | 87.3 | 88.1 | 88.3 |
| Retention of the phosphorus content (%) after 20 weathering cycles | 62.0 | 58.9 | 66.5 | 66.9 |
| Fire retardancy of woody material after 1,000 hour weathering | | | | |
| Number of brands rated "Passed" | 5 | 5 | 5 | 5 |
| Number of brands rated "Failed" | 0 | 0 | 0 | 0 |
| Evaluation | Passed | Passed | Passed | Passed |

Examples 10 to 12 and Referential Example 16

Six pine plates having a thickness of 4 mm, a length of 300 mm, a width of 200 mm and a moisture content of 9.2% were provided, and immersed in each of the following three treating solutions. The immersed plates were suspended in air by supporting the upper end of each sample to remove the excessive solution so that the amount of the fire retardant applied to each surface was 1.50 g as solids. The plates were left to stand at 25° C. for 7 days to cure the coating. The plates were then subjected to weathering under conditions in accordance with the U. S. D. A. FPL-1971 test through 42 cycles for 1000 hours, and dried in a desiccator at a humidity of 30 % until they reached a constant weight. The dried plates were subjected to a fire retardancy test with a flame contacting time of 3 minutes in accordance with the method of JIS 1322 applicable to the incombustibility of thin building materials. The results are shown in Table 3.

TABLE 3

| Referential Example (RE) or Example (E) | E 10 | E 11 | E 12 | RE 6 |
|---|---|---|---|---|
| Formulation (parts by weight) | | | | |
| 70% Aqueous DMPPA | 220 | — | — | Non-treated |
| 70% Aqueous 3-(diethylphosphono)propionamide (DEPPA) | — | 254 | — | |
| 70% Aqueous 3-(diisopropylphosphono)propionamide (DIPPPA) | — | — | 288 | |
| 70% methylated methylolmelamine | 464 | 464 | 464 | |
| Dialkylbenzene disulfonate (penetrant) | 5 | 5 | 5 | |
| 20% Hydrochloric acid (as HCl) | 100 | 100 | 100 | |
| Defoamer (NOPCO NDW) | 1 | 1 | 1 | |
| Methanol | 25 | 24 | 22 | |
| Total | 815 | 848 | 880 | |
| Solids concentration of the treating solution (%) | 61.8 | 62.2 | 62.6 | |
| Fire retardancy before weathering (flame content 3 minutes) | | | | |
| Char length (mm) | 42 | 63 | 78 | Totally burnt |
| After flame time (seconds) | 0 | 1 | 4 | — |
| After glow time (minutes) | 0 | 1 (second) | 8 (seconds) | — |
| Rating | Class 1 | Class 2 | Class 2 | — |
| Fire retardancy after weathering (flame content 3 minutes) | | | | |
| Char length (mm) | 48 | 78 | 107 | Totally burnt |
| After flame time (seconds) | 0 | 3 | 15 | — |
| After glow time (minutes) | 0 | 5 (seconds) | 33 (seconds) | — |
| Rating | Class 1 | Class 2 | Class 3 | — |

(*) The aqueous solutions of DMPPA, DEPPA and DIPPPA all had a phosphorus content of about 12%.

Example 13 and Referential Example 17

Four square plates of Japanese cypress measuring 3000 mm at one side and having a thickness of 8 mm were provided. A treating solution prepared by adding powdery melamine as a formaldehyde catcher to the formulation example 1 was coated by a brush on one surface of each of the two plates at a coverage rate of 250 g/m² as solids, and cured at 20° C. for 2 days and then at 60° C. for 5 hours. Thereafter, one untreated plate was added, and the plates were subjected to weathering under the conditions in accordance with the U. S. D. A. FPL-1971 method through 42 cycles (1000 hours), and dried in a desiccator at a humidity of 30% until their weight became constant (the water content was 8.2 to 8.5%). Then, a flame of a Bunsen burner was brought into contact with the plates so that the surface of the center of each of the plates maintained horizontal was heated to 1050 to 1100° C. for 3 minutes.

The results are shown in Table 4.

TABLE 4

| | Example 13 | Referential Example 17 |
|---|---|---|
| Method of fire-retardant coating | The method described above | Non-treated |
| Fire retardancy before weathering | | |
| At the time of heating by one contact with flame | A carbonized and foamed intumescent layer was formed at the part in contact with the flame | Ignited and totally burnt |
| Number of contacts with the flame until the fire perforated the sample | 7 | — |
| Fire retardancy after weathering | | |
| At time of heating by one contact with flame | Same as before weathering | Ignited and totally burnt |
| Number of contacts with flame until fire perforated sample | 6 | — |

EXAMPLE 14

Example 6 was repeated except that the fire retardant (pH 2.1), was obtained by using DMPPA which was purified five times by recrystallization from methanol to a purity of more than 99%.

AS a result, the retention of the phosphorus content was as high as 94.2% and 90.6% after weathering through 1 cycle and 20 cycles, respectively.

EXAMPLE 15

The same fire retarding treatment as in Example 6 was carried out by using a fire retardant (pH 2.1) which was obtained by adding 40 parts by weight of tetrabromobisphenol A and 5 parts by weight of polyvinyl pyrrolidone (number average molecular weight 360,000), as a dispersant. The treated sample was then subjected to weathering using water containing 130 ppm of CaO. The number of acceptable samples in the burning brand test was 5.

EXAMPLE 16

A cedar plate having a thickness of 10 mm and a moisture content of 12% was put in a glas pressure vessel, and held by a tool so that it did not float.

A fire retardant (pH 2.4) composed of 220 parts by weight of a 70% ethanol/water (50/50 weight) solution of DMPPA, 460 parts by weight of a 70% aqueous solution of methylated methylolmelamine, 3 parts by weight of NOIGEN ET-95 (a nonionic surfactant made by Daiichi Kogyo Seiyaku K. K.), 100 parts by weight of 20% hydrochloric acid and 217 parts of water was added so that the cedar plate completely submerged under the solution and a space was left in the upper part of the vessel. The pressure was reduced for about 20 minutes from a valve set up in the upper space until the atmospheric pressure reached 30 mmHg. At the outset, marked foaming occurred, but finally the generation of foams ceased. The valve at the upper part was opened and the pressure was returned to the atmospheric pressure. After standing for 30 minutes, the cedar plate was taken out and dried at 25 to 33° C. for 7 days.

The treated cedar plate contained the fire retardant solids at an average rate of 110 /m² throughout its surface, and the level of impregnation was within about 2 mm in depth. The treated cedar plate, either as such or after it was exposed outdoors for about 1 year at Takaishi City, Osaka-fu, Japan, and then dried to a moisture content of 8 to 12%, could not be burnt continuously by an ignition test using a Bunsen burner.

What is claimed is:

1. A fire retardant which is an aqueous solution comprising 100 parts by weight as solids content of a water-soluble 3-(dialkylphosphono)propionamide represented by the following general formula wherein each of $R_1$ and $R_2$ represents an alkyl group having 1 to 3 carbon atoms, and $R_3$ represents a hydrogen atom or a methyl group, and at least 100 parts by weight as solids of a watersoluble melamine resin as essential ingredients and having a pH of not higher than 3.

2. The fire retardant of claim 1 wherein the amount of the water-soluble melamine resin is 100 to 400 parts by weight as solids.

3. The fire retardant of claim 1 wherein the water-soluble 3-(dialkylphosphono)propionamide is 3-(dimethylphosphono)-propionamide, 3-(di-n-propylphosphono)-propionamide or 3-(diisopropylphosphono)propionamide.

4. The fire retardant of claim 2 wherein the water-soluble melamine resin is a precondensate or a condensate of hexamethylolmelamine, pentamethylolmelamine, tetramethylolmelamine or trimethylolmelamine esterified with an alcohol having 1 to 3 carbon atoms.

5. The fire retardant of claim 4 wherein the amount of the water-soluble melamine resin is 170 to 230 parts by weight as solids.

6. The fire retardant of claim 1 having a pH of from 2.5 to 1.5.

7. The fire retardant of claim 1 wherein the pH is adjusted to not higher than 3 with hydrochloric acid.

8. The fire retardant of claim 1 further comprising a penetrant stable at a pH of not more than 3 in an amount sufficient to aid in the penetration of the fire retardant into wood.

9. The fire retardant of claim 8 wherein the penetrant is a dialkyl benzene disulfonate-type surface active agent, a cationic surface-active agent or an amphoteric fluorocarbon based surface-active agent.

10. The fire retardant of claim 1 which further comprises one or more additional additives selected from defoaming agents, sedimentation preventing agents, crack preventing agents, acid-resistant disperse pigments, perfumes, deodorants, fire retardant other than said essential ingredients, and anti-sagging agents.

11. A fire retardant woody material prepared by treating a woody material with a fire retardant which is an aqueous solution comprising 100 parts by weight as solids content of a water-soluble 3-(dialkylphosphono) propionamide represented by the following general formula wherein each of $R_1$ and $R_2$ represents an alkyl group having 1 to 3 carbon atoms, and $R_3$ represents a hydrogen atom or a methyl group, and at least 100 parts by weight as solids of a water-soluble melamine resin as essential ingredients and having a pH of not higher than 3.

12. The fire retardant woody material of claim 11 wherein the surface of the woody material is treated with the fire retardant.

13. The fire retardant woody material of claim 12 wherein the fire retardant is coated on the surface of the fire retardant at a coverage rate of at least 100 g/m² as solids.

14. The fire retardant woody material of claim 11 wherein the fire retardant is impregnated into the woody material.

15. The fire retardant woody material of claim 12 wherein the fire retardant is coated on the surface of the fire retardant at a coverage rate of 150 to 300 g/m² as solids.

16. The fire retardant woody material of claim 3 in which the fire retardant is cured at a temperature of not more than 100° C.

17. The fire retardant woody material of claim 11 wherein the water-soluble 3-(dialkylphosphono)propionamide is 3-(dimethylphosphono)propionamide, 3-(di-n-propylphosphono)-propionamide or 3-(diisopropylphosphono)propionamide.

18. The fire retardant woody material of claim 17 wherein the fire retardant has a pH of from 2.5 to 1.5.

19. The fire retardant of claim 14 wherein the at least one additional fire retardant compound is selected from the group consisting of red phosphorus, phosphagen, polyammonium polyphosphate, chlorinated paraffins, chloroalkyl phosphates, and polybrominated bisphenols.

20. A fire retardant which is an aqueous solution comprising 100 parts by weight as solids content of a water-soluble 3-(dialkylphosphono)propionamide represented by the following general formula wherein each of $R_1$ and $R_2$ represents an alkyl group having 1 to 3 carbon atoms, and $R_3$ represents a hydrogen atom or a methyl group, at least 100 parts by weight as solids of a water-soluble melamine resin, and at least one additional fire retardant compound selected from the group consisting of water-soluble phosphorus-containing compounds, organic phosphorus-containing compounds, organic compounds containing phosphorus and halogen, and organic halogen compounds as essential ingredients and having a pH of not higher than 3.

21. A fire retardant woody material prepared by treating a woody material with the fire retardant of claim 20.

* * * * *